(12) United States Patent
Hawthorne (10) Patent No.: US 7,901,722 B2
(45) Date of Patent: Mar. 8, 2011

(54) APPARATUS FOR MAKING CANDY FLOSS

(76) Inventor: Robert John Cecil Hawthorne, Larne (GB)

( * ) Notice: Subject to any disclaimer, the term of this patent is extended or adjusted under 35 U.S.C. 154(b) by 851 days.

(21) Appl. No.: 11/719,568

(22) PCT Filed: Nov. 16, 2005

(86) PCT No.: PCT/EP2005/012358
§ 371 (c)(1),
(2), (4) Date: May 17, 2007

(87) PCT Pub. No.: WO2006/053759
PCT Pub. Date: May 26, 2006

(65) Prior Publication Data
US 2009/0074931 A1     Mar. 19, 2009

(30) Foreign Application Priority Data
Nov. 18, 2004  (GB) .................................. 0425357.1

(51) Int. Cl.
*A23G 3/02*   (2006.01)
(52) U.S. Cl. ........... 426/512; 426/517; 426/660; 426/91; 425/9; 425/126.2; 425/145
(58) Field of Classification Search .................. 426/517, 426/283, 512, 660, 520, 91, 103, 104, 274, 426/455, 456; 425/126.1, 126.2, 145, 9
See application file for complete search history.

(56) References Cited

U.S. PATENT DOCUMENTS

| 4,293,292 A | 10/1981 | Israel |
| 4,755,390 A * | 7/1988 | Calandro et al. .............. 426/293 |
| 5,876,764 A | 3/1999 | Buttin et al. |
| 2001/0041195 A1* | 11/2001 | Bandou et al. .................... 425/9 |

FOREIGN PATENT DOCUMENTS

| GB | 2219725 | * | 6/1989 |
| GB | 2219725 A | | 12/1989 |

OTHER PUBLICATIONS

International Search Report from corresponding Patent Cooperation Treaty Application No. PCT/EP05/12358, dated Feb. 8, 2006.

* cited by examiner

*Primary Examiner* — Drew E. Becker
*Assistant Examiner* — Preston Smith
(74) *Attorney, Agent, or Firm* — Van Dyke, Gardner, Linn & Burkhart, LLP (57) ABSTRACT

An apparatus for making candy floss comprising a rotatable bowl; a rotatable heating element located within the bowl; means for depositing a quantity of sugar into the bowl; and an actuating mechanism including means for gripping a stick. The actuating mechanism actuates a gripped stick in a first direction between an extended position, in which the stick is at least partially located within the bowl, and a retracted position in which the stick is withdrawn from the bowl. The actuating mechanism and/or the gripping means rotate the gripped stick about its longitudinal axis.

30 Claims, 4 Drawing Sheets

APPARATUS FOR MAKING CANDY FLOSS

CROSS REFERENCE TO RELATED APPLICATIONS

This application is a filing under 35 U.S.C. §371 of International Application No. PCT/EP05/12358, filed on Nov. 16, 2004, which claims priority from Great Britain patent application Ser. No. 0425357.1, filed on Nov. 18, 2004, the disclosures of which are hereby incorporated herein by reference in their entirety.

FIELD OF THE INVENTION

The present invention relates to an apparatus for making candy floss.

BACKGROUND TO THE INVENTION

Candy floss, also known as cotton candy, is traditionally made by a human vendor operating from a stall. Automated candy floss machines are known but can be unreliable. It would be desirable, therefore, to provide an improved automated candy floss apparatus.

SUMMARY OF THE INVENTION

One aspect of the present invention provides an apparatus for making candy floss, the apparatus comprising a rotatable bowl; a rotatable heating element located within the bowl; means for depositing a quantity of sugar into the bowl; and an actuating mechanism including means for gripping a stick, the actuating mechanism being arranged to actuate a gripped stick in a first direction between an extended position, in which the stick is at least partially located within the bowl, and a retracted position in which the stick is withdrawn from the bowl, and wherein the actuating mechanism and/or the gripping means are arranged to rotate the gripped stick about its longitudinal axis.

A second aspect of the invention provides a method of making candy floss in an apparatus comprising a rotatable bowl; a rotatable heating element located within the bowl; means for depositing a quantity of sugar into the bowl; and an actuating mechanism including means for gripping a stick, the method comprising actuating a gripped stick in a first direction between an extended position, in which the stick is at least partially located within the bowl, and a retracted position in which the stick is withdrawn from the bowl; and rotating the gripped stick about its longitudinal axis.

Preferred features of the invention are recited in the dependent claims appended hereto.

Further advantageous features of the invention will become apparent to those ordinarily skilled in the art upon review of the following description of a specific embodiment of the invention.

BRIEF DESCRIPTION OF THE DRAWINGS

An embodiment of the invention is now described, by way of example, and with reference to the accompanying drawings in which.

DETAILED DESCRIPTION OF THE DRAWINGS

Figure 1:
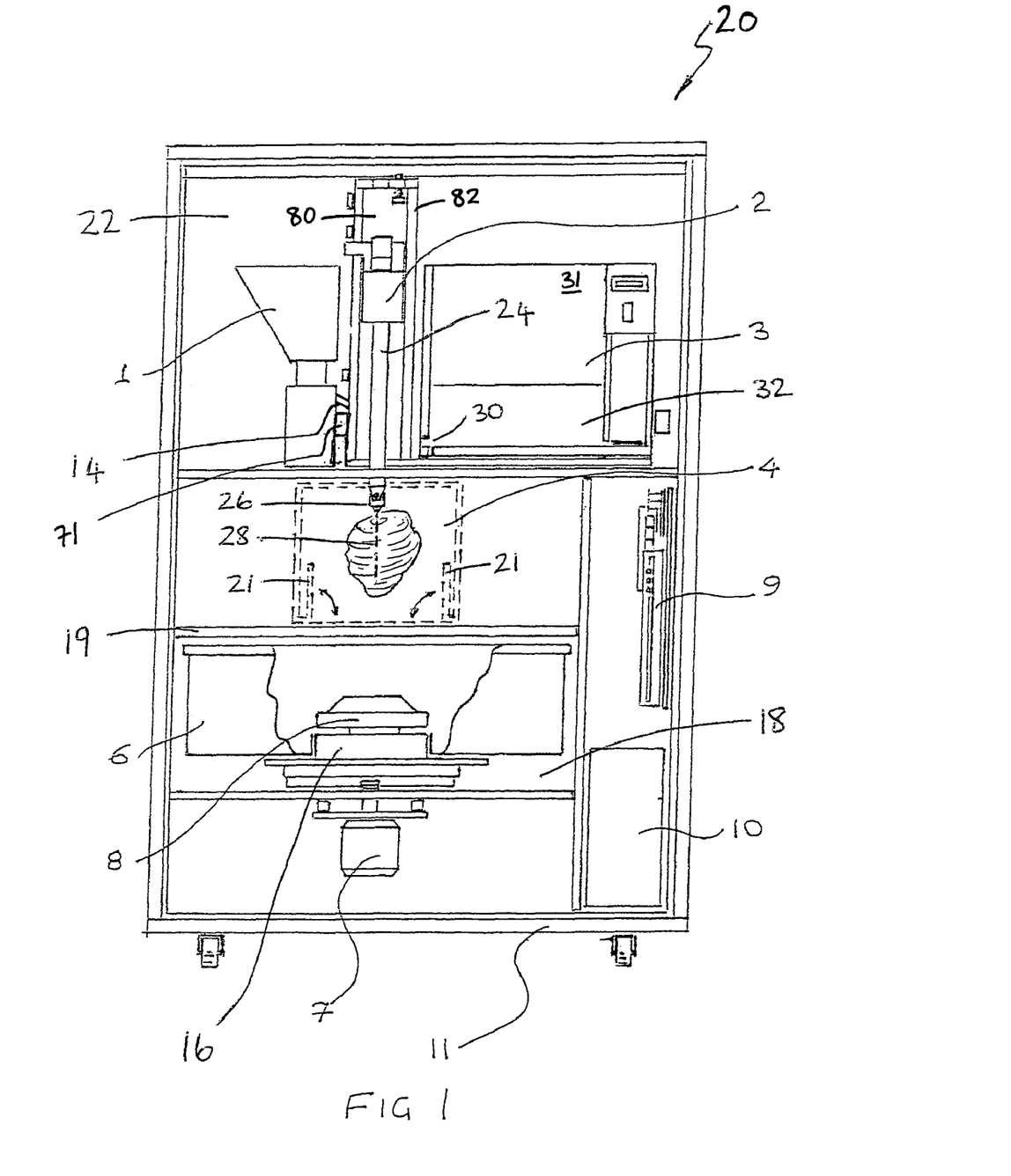
FIG. 1 presents a front view of an apparatus embodying the invention, in which a front door is open.

Referring now to FIG. 1 of the drawings, there is shown, generally indicated as 20, a preferred embodiment of an apparatus for making candy floss according to the invention. The apparatus 20 is housed within a cabinet 11 of generally rectangular cross section. In FIG. 1, the apparatus 20 is shown in front view with its front door (not shown in FIG. 1) open or removed so that the internal components may be viewed.

The apparatus 20 includes a spindle component 16 which, in use, is driven by a motor 7 to rotate about an, in use, substantially vertical axis. A bowl 6 is coupled to the spindle component 16 for rotation therewith. The motor 7 is also coupled to a spindle head 8 in order to drive the spindle head 8, in use, about a substantially vertical axis. In FIG. 1, the bowl 6 is shown in a partially cut-away form so that the spindle 16 and spindle head 8 may be seen. A gearing mechanism (not shown) is typically provided between the motor 7 and the spindle component 16 and/or the spindle head 8 so that the spindle component 16 and the spindle head 8 may be driven at different speeds with respect to the motor speed and, preferably, with respect to each other. The preferred arrangement is such that the bowl 6 and the spindle head 8 may be rotated at different speeds with respect to one another. The spindle head 8 includes a heating element (not shown), conveniently an electrically heatable element, which may be heated while the spindle head 8 is rotated by the motor 7. The bowl 6 and the spindle head 8 are, conveniently, substantially concentric and are preferably substantially circular in cross-section perpendicular to the axis of rotation.

The bowl 6 and spindle head 8 assembly is located in a chamber 18 which is bounded on its, in use, upper side by a partition 19. An aperture (not visible in FIG. 1) is formed in the partition 19 above the bowl 6 and optionally substantially in register with the spindle head 8. In FIG. 1, a pair of flaps or doors 21 are provided for closing the aperture. A vending chamber 4 is provided, in use, above the partition 19.

The apparatus 20 further comprises a storage chamber 22 which houses a sugar hopper 1, a stick hopper 3 and a first actuator 2. The actuator 2 includes an actuating arm 24 which is capable of reciprocating movement along an, in use, substantially vertical axis. The free end of the actuating arm 24 carries a gripper 26 which is capable of gripping sticks (a gripped stick 28 being shown in dashed outline by way of example). The gripper 26 is capable of pivotal movement about an, in use, horizontal axis with respect to the actuating arm 24.

The stick hopper 3 is a gravity-feed hopper and has an outlet 30. In use, the sticks are held in a substantially horizontal disposition in the hopper 3. The hopper 3 includes a guide-plate 32, which is preferably obliquely disposed with respect to the front face 31 of the hopper 3 at an angle preferably between 30 and 45 degrees. The arrangement is such that, during use, one stick at a time is located at the bottom of the hopper 3 with one end in register with the outlet 30. When said one stick is removed from the hopper 3, the next stick falls into the bottom hopper location. Preferably, the stick hopper 3 includes agitating means (e.g. a vibrating mechanism (not shown)) for agitating the sticks within the hopper 3.

In the preferred embodiment, the sticks are of substantially circular transverse cross section and may advantageously be made from paper or cardboard. The sticks may alternatively be made from any other material that is capable of being wetted, and preferably of absorbing moisture, in the manner described below.

Wetting means (not shown) typically in the form of one or more sponge or liquid dispenser are associated with the outlet 30 such that each stick is wetted or dampened as it passes out of the stick hopper 3. In the preferred embodiment, water pump 71 is used to wet the sticks, as is described in more detail hereinafter.

A second actuating means (not shown) is associated with the hopper for ejecting sticks from the hopper 3. In particular, the actuating means ejects the stick which occupies the bottom hopper location. Conveniently, the second actuating means may be arranged to push each stick from the bottom hopper location out of the aperture 30.

An extendible and retractable tube 14 is associated with the sugar hopper 1 for directing quantities of sugar from the hopper 1 into the bowl 6. The tube 14 is extendible/retractable between an extended state, in which the free end of the tube 14 is located in or adjacent the bowl 6, and retracted state in which the free end of the tube 14 is clear of the bowl, and preferably also clear of the vending chamber 4. In the illustrated embodiment, the free end of tube 14 is located in the storage chamber 22 when retracted, as shown in FIG. 1.

The operation of the preferred apparatus 20 is now described. When the apparatus 20 is activated, electrical power is supplied to the heating element at the spindle head 8 in order to generate heat typically in the region of around 112° C. A quantity of sugar, enough to make say, a single or a double helping of candy floss, is deposited into the bowl 6 via the extended tube 14. After depositing the quantity of sugar, the tube 14 retracts from the bowl 6. The motor 7 effects rotation of the spindle head 8 and of the bowl 6. The spindle head 8 which, by way of example may be approximately 5½ inches in diameter, is rotated at a suitable speed which may, for example, be in the region of approximately 5000 to 8000 rpm, typically approximately 6,500 rpm. The bowl 6 is rotated more slowly at a speed of, for example, approximately 3 to 10 rpm, typically 7 rpm. The heating element at the spindle head 8 heats and melts the deposited sugar. This, in combination with the spinning spindle head 8, causes the melted sugar to turn into candy floss which then gathers in the bowl 6. While the candy floss is being formed, the doors 21 are in the closed position thereby isolating the bowl chamber 18 from the vend chamber 4.

The first actuator 2 positions the gripper 26 in register with the outlet 30. The second actuator (not shown) pushes a stick out of the stick hopper 3, through or past the wetting means, and through or past the gripper 26 until the relative position of the gripper 26 and the ejected stick is such that the gripper 26 is in a position to grip the stick adjacent a free end. The gripper 26 then grips the ejected stick. At this time, the ejected stick is held in a horizontal disposition. The actuator 2 then pivots the gripper 26 through approximately 90° so that the gripped stick 28 is substantially vertically disposed. In the embodiment shown in FIG. 1, because of space restrictions, the gripper 26 does not grip the leading end of the ejected stick (i.e. the end that is first ejected from the hopper 3) but rather allows the stick to be fed past the gripper 26 in order that the gripper 26 may grab the other end of the stick. At this time, the gripper 26 holds the gripped stick in the vend chamber 4 above the doors 21. The doors 21 are then opened (by any suitable actuating mechanism (not shown)) and the actuator 2 lowers the gripped stick 28 into the bowl 6 into a loading position. The actuator 2/gripper 26 rotates the gripped stick 28 about its longitudinal axis (i.e. about a substantially vertical axis). The gripped stick 28 may be rotated between 20 and 50 rpm, preferably at, or approximately at, 30 rpm. The combined action of the rotating bowl 6 and the rotating gripped stick 28 causes the candy floss within the bowl to be gathered around, or folded around, the gripped stick 28. When the gripped stick 28 is loaded with candy floss, the first actuator 2 withdraws the gripped stick 28, together with the loaded candy floss, from the bowl 6 into the vending chamber 4 (as illustrated in FIG. 1). The doors 21 are then closed.

Figure 2:
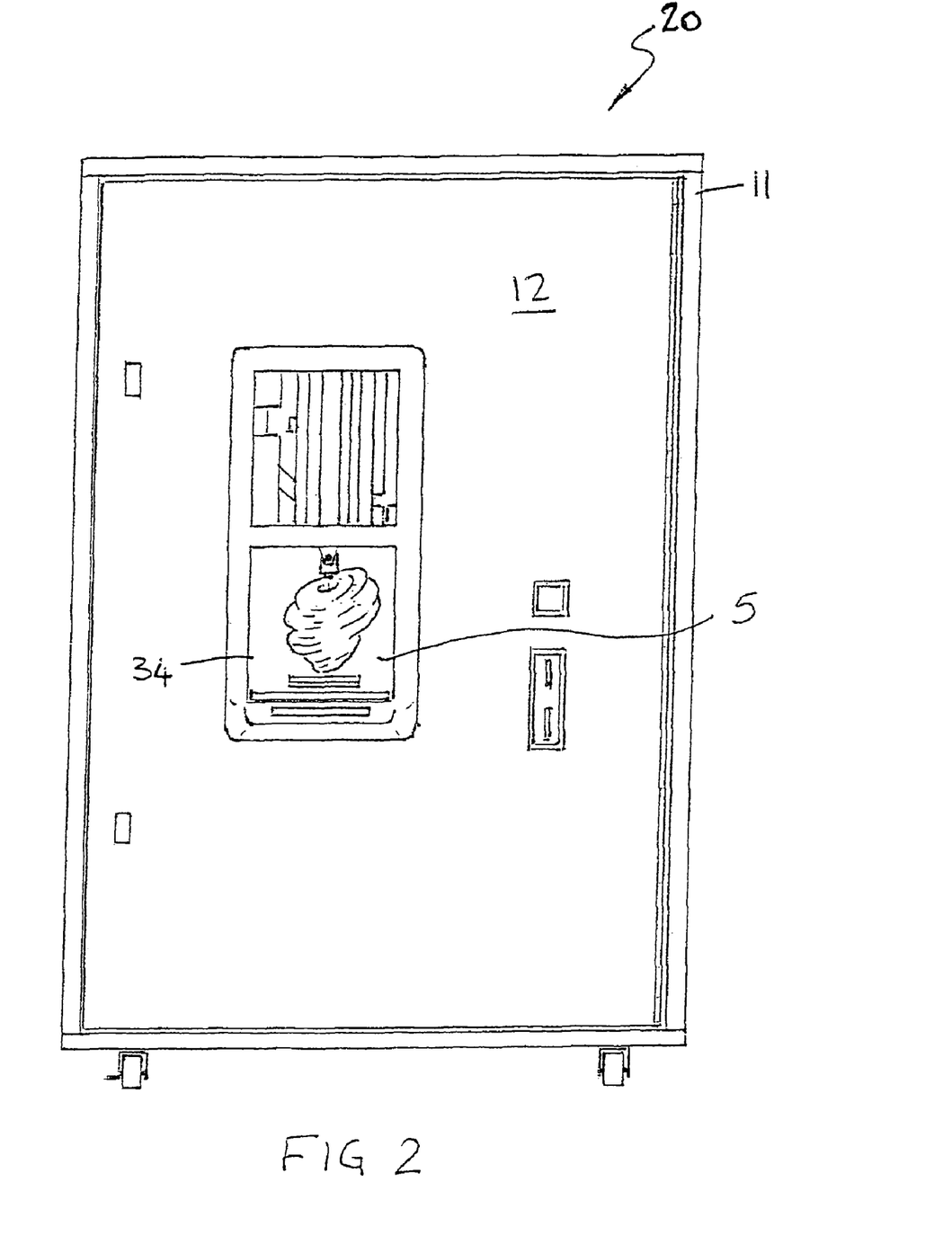
FIG. 2 is a front view of the apparatus of FIG. 1 in which the front door is shown in a closed position.

Referring now to FIG. 2, which shows the apparatus 20 with a closed front door, an external door 34 (which is typically transparent) may then be opened to allow a buyer to remove the candy floss loaded stick from the vend chamber 4 by a vend outlet 5.

The operation as described above typically takes in the region of 60 to 70 seconds. It is found that approximately 40 single helpings of candy floss may be obtained from approximately 1 kilogram of sugar. It is preferred to wet or dampen the sticks before use to help the candy floss grip onto the stick. This is particularly helpful in cases where the sticks are of substantially circular cross section.

The various component parts of the apparatus 20 and the operation thereof may conveniently be controlled by a control unit 9 which may take any suitable conventional form, for example a Programmable Logic Controller (PLC) or a microprocessor/micro-controller based system. Electrical power is supplied to the various components by a power conversion unit 10.

Referring now to FIGS. 3 to 6, preferred features of the invention are described.

FIGS. 3 to 6 show a preferred embodiment of an actuating mechanism and preferred embodiment of a gripping mechanism as is described in more detail below. FIGS. 3 to 6 show a motor 50 for rotating actuating arm 24, thereby rotating a gripped stick 28 during use. The gripper, or gripping head 26, comprises two separate gripping mechanisms. A first gripping mechanism is indicated at 52 and comprises a body 54 shaped to define a channel or aperture 56 through which a stick 28 (not shown in FIGS. 3 to 6) can be passed. The body 54 is rotatable, or pivotable, about an, in use, horizontal axis A. As can be seen from FIGS. 4 and 6, the body 54 is associated with gripping means 58 in the form of, for example, a solenoid actuator. The actuator 58 includes an actuating rod (not shown) which may pass through the body 54 and into the aperture 56 in order to grip a stick 28 thereby holding it in a fixed position with respect to the body 54.

A second gripping mechanism 60 comprises gripping jaws 62. The gripping jaws 62 are aligned with the aperture 56 of the first gripping mechanism 52 when the aperture of the first gripping mechanism 52 is disposed, in use, in a generally vertical orientation (as shown for example in FIG. 3). The arrangement is such that the jaws 62 are able to grip a portion of a gripped stick 28 protruding from the aperture 56.

Figure 3:
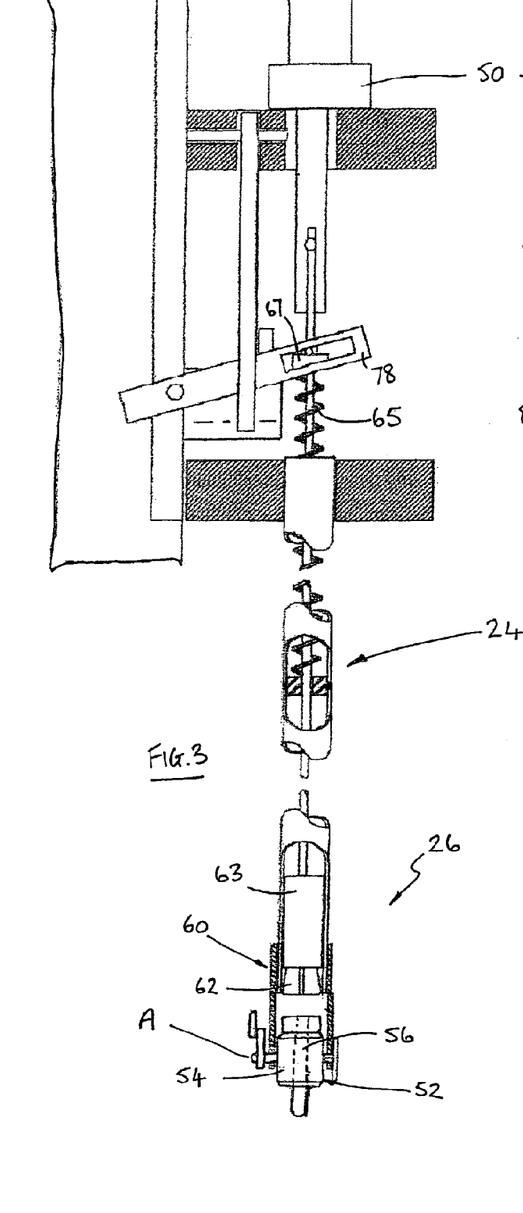
FIG. 3 shows a preferred actuating and gripping mechanism in a first state of operation and shown from a first angle.
Figure 5:
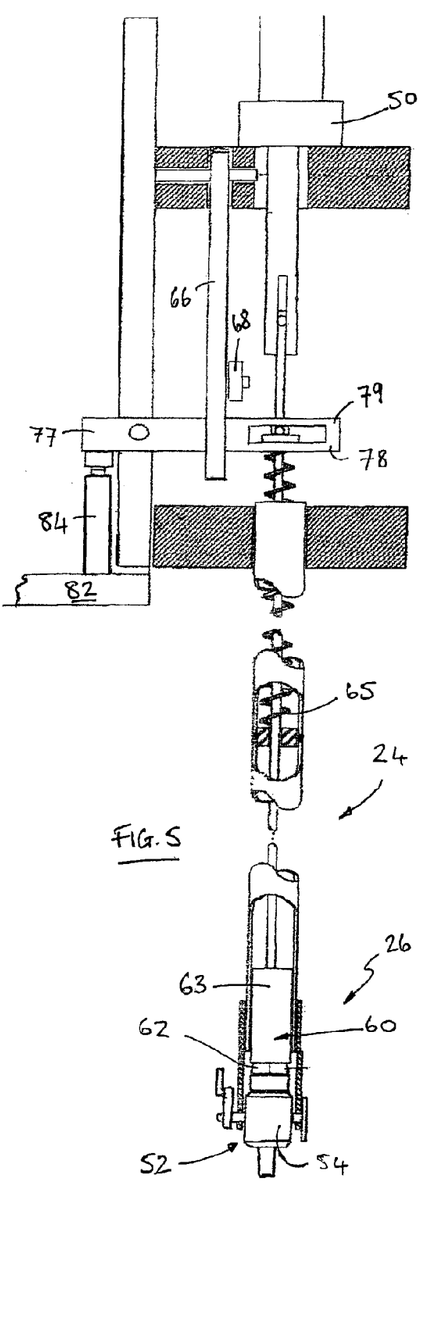
FIG. 5 shows the actuating and gripping mechanism in a second state of use from said first angle.

In the illustrated embodiment, the jaws 62 are actuated between their gripping and non-gripping states by a movable sleeve 63 fitted around the jaws 62 and slidable with respect thereto in a direction along the longitudinal axis of the arm 24. In FIG. 3, the sleeve 63 is in a retracted position and so the jaws 62 are open. Movement of the sleeve 63 in a downwards direction (as viewed in the drawings) causes the jaws 62 to close (as shown in FIG. 5). Preferably, biasing means in the form of, for example a spring 65 and in particular a compression spring, is provided between the sleeve 63 and a stop 67.

Also shown in FIGS. 3 to 6 is actuating means in the preferred form of a lever 78 for actuating the second gripping mechanism 60 between a first state (see FIG. 3), in which it is spaced apart from the first gripping mechanism 52 and in which the jaws 62 are typically in an open state, and a second state (see FIG. 5) in which the second gripping mechanism 60 is moved downwardly (as viewed in the drawings) adjacent the first gripping mechanism 52 and in which the jaws 62 are closed in order that the second gripping mechanism 60 may grip an end, or other portion, of a stick which protrudes, during use, from the body 54 of the first gripping mechanism 52.

In the illustrated embodiment, when the lever 78 pivots clockwise (as viewed in FIG. 3) to actuate the gripping mechanism 60 into said second state, the lever 78 acts on the sleeve 63 via the spring 65 to close the jaws 62. Preferably, means (not shown) for controlling and/or adjusting the tension exerted by the gripping jaws 62 are provided. The adjusting means may take any suitable form and may, for example, take the form of a disc or sheath (not shown) fitted between the stop 67 and the spring 65 and being moveable, e.g. by a threaded mechanism, in an in use vertical direction in order to adjust the tension in the spring 65.

In the preferred embodiment, the actuating arm 24 and its associated components, including the lever 78, gripping head 26, and latching detent (to be described hereinafter), are carried by a carriage 80 that is movable in an in use vertical direction with respect to a frame 82, the frame 82 occupying a fixed position in the cabinet 11 (in the storage chamber 22 as shown in FIG. 1). The carriage 80 is movable by any suitable mechanical or electro-mechanical means (not shown). The carriage 80 is movable between a retracted position, in which the gripper head 26 can be aligned with the outlet of the hopper 3, and an extended position in which a stick gripped by the gripper head 26 is located in the bowl 6. In FIG. 1, the carriage 80 is in a vend position between the retracted and extended positions. The lever 78 may be actuated in any convenient manner. In the preferred embodiment, a stop 84 (shown in FIG. 5), which is fixed with respect to the frame 82, is provided for engagement with one end 77 of the lever 78 as the carriage 80 moves downwards. The other end 79 of the lever 78 acts on the gripping mechanism 60, the lever 78 being pivoted with respect to the carriage 80 between the ends 77, 79. Hence, as the carriage 80 moves downwardly, the stop 84 causes the lever 78 to pivot clockwise (as viewed in FIGS. 3 and 5) from the position shown in FIG. 3 to the position shown in FIG. 5.

Figure 4:
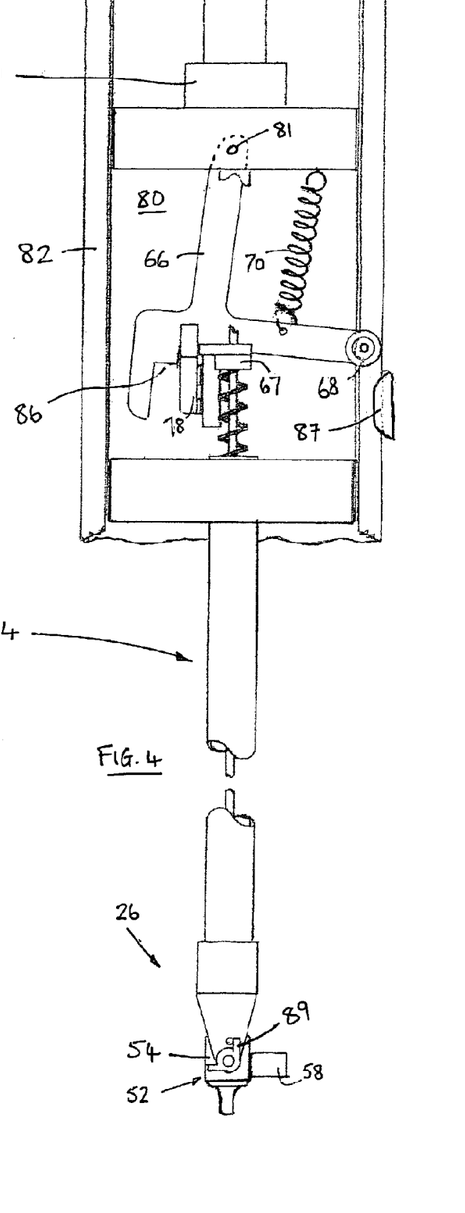
FIG. 4 shows the actuating and gripping mechanism of FIG. 3 shown from a second angle approximately 90° displaced from said first angle.
Figure 6:
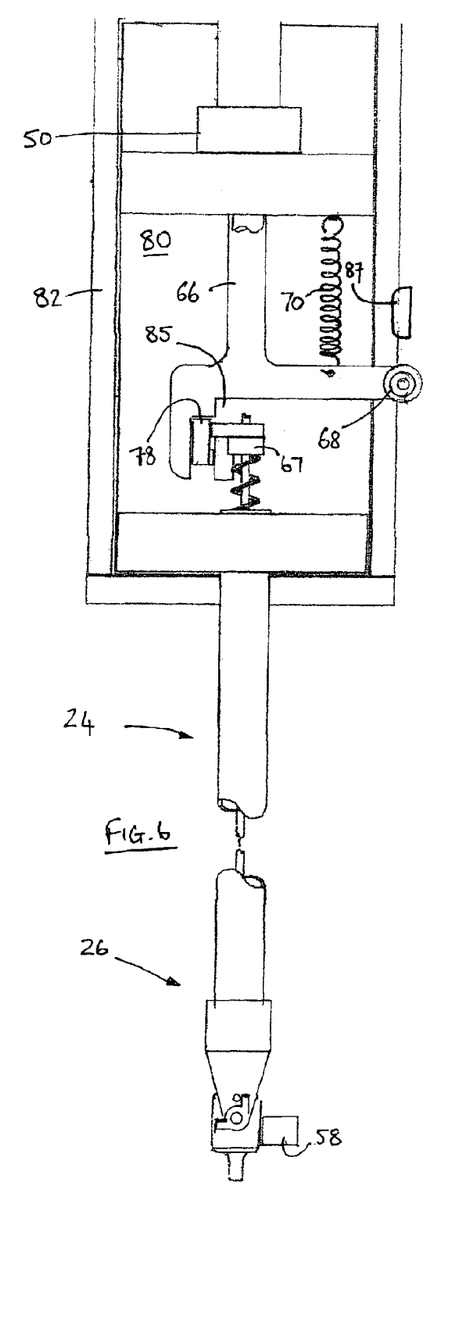
FIG. 6 shows the actuating and gripping mechanism of FIG. 5 from said second angle.

Also shown in FIGS. 3 to 6 is a latching detent 66 for holding the lever 78 in the state wherein it causes the gripping mechanism 60 to adopt its gripping state (as shown in FIGS. 5 and 6). The detent 66 is conveniently pivotable with respect to the carriage 80 and biased to adopt a latched state (shown in FIGS. 5 and 6). In FIG. 4 a suitable pivot point for the detent 66 is shown at 81, and biasing means in the convenient form of a spring 70 is shown, the spring 70 being arranged to urge the detent 66 about its pivot point 81 (in an anti-clockwise direction as viewed in FIGS. 4 and 6) into its latching position (shown in FIGS. 5 and 6). The detent 66 is conveniently shaped to define first and second seats 85, 86 for receiving the lever 78. When the detent is in the unlatched state and the lever 78 is up (FIGS. 3 and 4), part of the lever 78 sits in the seat 85. When the lever 78 pivots downwardly, it leaves the seat 85 and the detent 66 is able to pivot, under the action of the spring 70, into its latched state in which part of the lever 78 is seated in seat 86 (FIGS. 5 and 6). When in the latched state, the detent 66 prevents the lever 78 from moving out of the position where it causes the gripping mechanism 60 to grip.

Conveniently, the detent 66 is actuated out of its latching state in response to, in use, upward movement of the carriage 80 out of its extended position. To this end, an abutment 87 is provided, fixed with respect to the frame 82. the arrangement is such that, upon upward movement of the carriage 80 out of the extended state, a portion 88 of the detent 66 engages with the abutment 87, the engagement causing the detent 66 to be actuated out of its latching state (in the illustrated embodiment, said engagement causes clockwise pivoting of the detent 66 about the pivot point 81). Said portion 88 of the detent advantageously carries a roller cam 68 to facilitate its inter-engagement with the abutment 87. Inter-engagement of the abutment 87 and detent 66/cam 68 may also occur when the carriage moves downwardly from the retracted state, such inter-engagement serving to assist, or cause (for example if the spring 70 is not present), the detent to adopt the latched state. In the preferred embodiment, the arrangement is such that the detent 66 releases the lever 78 when the carriage 80 reaches the vend position. Hence, the stick 28 is released in the vend chamber 4.

In use, sticks (not shown) are stored in the hopper 3 in the manner described above and are ejected from the hopper via outlet 30 by, for example, a solenoid operated actuator (not shown) linked to an optical detector (not shown).

The first gripping mechanism 52 is rotated so that its aperture 56 is generally horizontally disposed and aligned with the outlet 30 of the hopper 3. A stick is ejected from the hopper and passes into the aperture 56 of the first gripping mechanism 52. In the preferred embodiment, the stick is pushed through the aperture 56 so that the greater part of the stick protrudes from the other end of the aperture 56 and only a relatively small portion of the stick (e.g. about 8 mms) protrudes from the end of the aperture 56 that faces the outlet 30.

Water (or other liquid) dispensing means, for example including a pump 71 (see FIG. 1) are provided for dispensing water, or other liquid, onto the ejected stick. It is preferred to use a liquid dispenser comprising a peristaltic pump. In particular, the pump 71 is arranged to dispense water on to the portion of the stick that has been pushed through the aperture 56 distal the outlet 30. To this end, the pump 71, or at least its nozzle or outlet, is advantageously located on the far side of the gripping mechanism 52 with respect to the aperture 30—it is preferred not to wet the stick before passing it through the aperture to reduce the risk of jamming. The amount of water that is dispensed onto the stick depends on the diameter or width of the stick and on the substance from which it is made. For a paper stick of approximately 5 mms in diameter it is found that only two drops of water are required. In the preferred arrangement, the outlet or nozzle of the pump 71 (not shown) is positioned so that it is adjacent or in close proximity with the portion of the stick that projects from the gripping mechanism 52. For example, the nozzle may be approximately 1 mm from the stick. As a result, as one or more drops are dispensed from the nozzle, and as the stick is being pushed past the nozzle, water from the pump 71 is spread along the length of the stick whereupon it is absorbed into the paper. This has the effect of adequately wetting the stick. In this embodiment, substantially the entire length of the stick is wetted, except for the end portion that is located in the gripping mechanism 52.

The gripping means 58 is activated to hold the dispensed stick in a fixed state with respect of the body 54 of the first gripping mechanism 52. The first gripping mechanism 52 is then rotated through approximately 90° until the gripped stick is generally vertically disposed (as shown in the drawings). The pivotal or rotational movement of the first gripping mechanism 52 may be performed in any convenient manner, e.g. by means of an electro-mechanical actuator. However, in the preferred embodiment, the mechanism 52 includes one or more projections 89 for engagement with one or more abutments (not shown) fixed relative to the frame 82 such that relative movement of the carriage 80 and the frame 82 causes the projection(s) 89 to engage with the abutment(s) thereby pivoting the mechanism 52 about axis A.

The actuating arm 34 and gripping head 26 assembly are lowered downwardly (by a downward movement of the carriage 80) until the gripped stick is located in the bowl 6, as described above. During this travelling movement, lever 78 is activated (i.e. pivoted clockwise as viewed in the drawings) so that the second gripping mechanism 60 engages with the end of the stick that protrudes from the body 54 of the first gripping mechanism 52. The gripping means 58 of the first gripping mechanism 52 may then be released so that the stick is only gripped by its end and is only gripped by the second gripping mechanism 60. The second gripping mechanism 60 is rotatable about, and in use, vertical axis.

The stick may therefore be rotated within the bowl 6 in order to gather candy floss as described above. At the end of the spin cycle, the gripper head 26 is withdrawn from the bowl 6 into the vend chamber 4. The vend flaps 21 close and the gripper head latching detent 66 is disengaged when the release cam 68 is actuated by the abutment 87. The stick carrying the candy floss is consequently released from the gripper head 26 and falls under the influence of gravity on to the closed vend flaps 21 whereupon it may be retrieved by a buyer.

The invention is not limited to the embodiment described herein which may be modified or varied without departing from the scope of the invention.

The invention claimed is:

1. An apparatus for making candy floss, the apparatus comprising:
    a rotatable bowl;
    a rotatable heating element located within the bowl;
    means for depositing a quantity of sugar into the bowl;
    an actuating mechanism including a stick gripper, the actuating mechanism being arranged to actuate a gripped stick in a first direction between an extended position, in which the stick is at least partially located within the bowl, and a retracted position in which the stick is withdrawn from the bowl;
    wherein the actuating mechanism is arranged to rotate the gripped stick about its longitudinal axis; and
    wherein the apparatus further includes a wetting means for wetting the stick along at least part of its length.

2. An apparatus as claimed in claim 1, further including a receptacle for storing a plurality of sticks, the receptacle including an outlet and means for dispensing sticks, one at a time, through said outlet.

3. An apparatus as claimed in claim 2, wherein each stick is dispensed from said outlet in a second direction, and with its longitudinal axis being substantially disposed in said second direction, the second direction being substantially perpendicular to said first direction.

4. An apparatus as claimed in claim 2, wherein said stick gripper includes a first gripping mechanism for gripping said stick as it is dispensed from said receptacle, the first gripping mechanism being pivotable about an axis disposed in said second direction.

5. An apparatus as claimed in claim 4, wherein said, first gripping mechanism includes a body shaped to define an aperture for receiving a dispensed stick, the first gripping mechanism being operable to adopt a first position in which said aperture is aligned with the receptacle outlet such that, upon being dispensed, the stick passes through the aperture.

6. An apparatus as claimed in claim 5, wherein the first gripping mechanism further includes means for releasably holding the dispensed stick with respect to the body.

7. An apparatus as claimed in claim 5, wherein each stick has a leading end, which is dispensed first from the receptacle outlet, and a lagging end, which is dispensed last from the outlet, and wherein said first gripping mechanism is located, when in said first position, adjacent the outlet of the receptacle, such that the lagging end of a dispensed stick is located in said body, the leading end projecting beyond the body with respect to the receptacle.

8. An apparatus as claimed in claim 4, wherein said stick gripper includes a second gripping mechanism for gripping a dispensed stick, and means for rotating the second gripping mechanism about an axis, the second gripping mechanism being arranged to rotate a gripped dispensed stick about the longitudinal axis of the stick.

9. An apparatus as claimed in claim 8, wherein said second gripping mechanism is arranged to rotate said gripped stick about an axis that is disposed substantially in said first direction.

10. An apparatus as claimed in claim 8, including means for effecting relative movement of the first and second gripping mechanisms towards and away from one another.

11. An apparatus as claimed in claim 10, wherein said means for effecting relative movement is arranged to move one or other or both said first or second gripping mechanisms in said first direction.

12. An apparatus as claimed in claim 11, wherein said means for effecting relative movement is arranged to move said second gripping mechanism towards and away from said first gripping mechanism.

13. An apparatus as claimed in claim 10, wherein said first and second gripping mechanisms are movable between a first position, in which they are spaced apart and the first gripping mechanism is able to pivot about its pivot axis without interference from the second gripping mechanism, and a second position in which they are adjacent one another in order that the second gripping mechanism is able to grip a portion of a stick gripped by said first gripping mechanism.

14. An apparatus as claimed in claim 8, wherein the first and second gripping mechanism's are carried by a common arm, the arm being actuatable by said actuating mechanism in said first direction.

15. An apparatus as claimed in claim 14, wherein said first gripping mechanism is located at or adjacent a free end of said arm.

16. An apparatus as claimed in claim 14, wherein said first gripping mechanism is pivotable with respect to the arm about an axis that is substantially perpendicular with the longitudinal axis of the arm.

17. An apparatus as claimed in claim 14, wherein said second gripping mechanism is movable with respect to the arm in a direction substantially along or parallel with the longitudinal axis of the arm.

18. An apparatus as claimed in claim 14, wherein, in one state of use, the first gripping mechanism is orientated with respect to the arm such that the stick receiving aperture is substantially in line with, or parallel with, the longitudinal axis of the arm.

19. An apparatus as claimed in claim 8, wherein the second gripping mechanism comprises at least two opposable gripping jaws.

20. An apparatus as claimed in claim 1, wherein said wetting means is arranged to wet said stick along substantially all of its length.

21. An apparatus as claimed in claim 1, wherein the wetting means comprises a liquid dispenser capable of dispensing liquid one drop at a time.

22. An apparatus as claimed in claim 1, wherein the wetting means includes a peristaltic pump.

23. An apparatus as claimed in claim 1, further including a receptacle for storing a plurality of sticks, the receptacle including an outlet and means for dispensing sticks, one at a time, through said outlet and wherein the wetting means is positioned to wet each stick as it is dispensed from the receptacle.

24. An apparatus as claimed in claim 23, wherein the wetting means includes a nozzle for dispensing liquid in drops, the nozzle being positioned to dispense one or more drops onto a stick being dispensed, and being sufficiently close to the stick that the dispensed drops are spread along the length of the stick by the nozzle as the stick is dispensed.

25. An apparatus as claimed in claim 23, wherein the first gripping mechanism is located between the wetting means and the receptacle outlet.

26. An apparatus as claimed in claim 1, wherein said sticks are formed from paper.

27. A method of making candy floss in an apparatus, the method comprising:
providing a rotatable bowl, a rotatable heating element located within the bowl, means for depositing a quantity of sugar into the bowl, a stick, a wetting means for wetting the stick, and an actuating mechanism including a stick gripper;
gripping the stick with the stick gripper;
actuating the gripped stick in a first direction between an extended position, in which the stick is at least partially located within the bowl, and a retracted position in which the stick is withdrawn from the bowl;
rotating the gripped stick about its longitudinal axis;
wetting the stick along at least part of its length with the wetting means.

28. A method as claimed in claim 27, wherein said wetting comprises wetting the stick along substantially all of its length.

29. A method as claimed in claim 27, wherein said wetting comprises wetting each stick as it is dispensed from a receptacle.

30. A method as claimed in claim 27, wherein said wetting comprises:
dispensing one or more drops onto the stick being dispensed; and
causing each dispensed drop to be spread along the length of the stick as the stick is dispensed.

* * * * *

UNITED STATES PATENT AND TRADEMARK OFFICE
CERTIFICATE OF CORRECTION

| | | |
|---|---|---|
| PATENT NO. | : 7,901,722 B2 | Page 1 of 1 |
| APPLICATION NO. | : 11/719568 | |
| DATED | : March 8, 2011 | |
| INVENTOR(S) | : Robert John Cecil Hawthorne | |

It is certified that error appears in the above-identified patent and that said Letters Patent is hereby corrected as shown below:

In the Heading
Title "(54) APPARATUS FOR MAKING CANDY FLOSS" should be --(54) AN APPARATUS FOR MAKING CANDY FLOSS--

In the Claims

Column 7
Line 62, Claim 5, Delete "," after "said"

Column 8
Line 43, Claim 14, "mechanism's" should be --mechanisms--

Column 10
Line 9, Claim 27, Insert --and-- after "axis;"

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 7,901,722 B2  
APPLICATION NO. : 11/719568  
DATED : March 8, 2011  
INVENTOR(S) : Robert John Cecil Hawthorne Page 1 of 1

It is certified that error appears in the above-identified patent and that said Letters Patent is hereby corrected as shown below:

Title Page,
Item [54], and in the Specification, Column 1, Title, the word "AN" (as inserted by the Certificate of Correction issued May 14, 2013) should be deleted and title is reinstated to read -- APPARATUS FOR MAKING CANDY FLOSS --.

Signed and Sealed this
Eleventh Day of June, 2013

Teresa Stanek Rea
*Acting Director of the United States Patent and Trademark Office*